(12) United States Patent
Adarve Lozano

(10) Patent No.: US 7,964,847 B2
(45) Date of Patent: Jun. 21, 2011

(54) ILLUMINATING SYSTEM FOR IN-FLIGHT REFUELING OPERATIONS

(75) Inventor: Alberto Adarve Lozano, Madrid (ES)

(73) Assignee: EADS Construcciones Aeronauticas, S.A., Madrid (ES)

(*) Notice: Subject to any disclaimer, the term of this patent is extended or adjusted under 35 U.S.C. 154(b) by 13 days.

(21) Appl. No.: 12/473,289

(22) Filed: May 28, 2009

(65) Prior Publication Data

US 2010/0237249 A1    Sep. 23, 2010

(30) Foreign Application Priority Data

Mar. 18, 2009  (EP) .................................. 09382034

(51) Int. Cl.
*G01J 5/02*    (2006.01)
(52) U.S. Cl. .................................................. 250/341.1
(58) Field of Classification Search ............... 250/341.1; 244/135 A
See application file for complete search history.

(56) References Cited

U.S. PATENT DOCUMENTS

| | | | | |
|---|---|---|---|---|
| 3,963,920 A * | 6/1976 | Palmer | .......................... | 250/239 |
| 4,398,685 A * | 8/1983 | Task et al. | .................. | 244/135 A |
| 2005/0269455 A1 * | 12/2005 | Hewitt et al. | ............. | 244/135 A |
| 2007/0023576 A1 * | 2/2007 | Schroeder | ................. | 244/135 A |

* cited by examiner

*Primary Examiner* — David P Porta
*Assistant Examiner* — Marcus H Taningco
(74) *Attorney, Agent, or Firm* — Ladas & Parry LLP

(57) ABSTRACT

The invention relates to a system for illuminating an in-flight refueling operation involving a tanker aircraft (14) and a receiver aircraft (13), comprising: a generating device (2) for generating a light emission, substantially in a near infrared spectrum; a directing device (12) for directing the emission to define an emission envelope (15) containing a spatial range of in-flight refueling positions of the receiver aircraft (13) relative to the tanker aircraft (14); further comprising a collecting device (3) for collecting the light emission generated by the generating device (2) and means (5) for transmitting the light emission collected by the collecting device (3) to the directing device (12). The invention also relates to a method for illuminating an in-flight refueling operation involving a tanker aircraft (14) and a receiver aircraft (13), said method defining an emission envelope (15) which contains a spatial range of in-flight refueling positions of the receiver aircraft (13) relative to the tanker aircraft (14).

13 Claims, 2 Drawing Sheets

ILLUMINATING SYSTEM FOR IN-FLIGHT REFUELING OPERATIONS

FIELD OF THE INVENTION

The present invention relates to an illuminating system for in-flight refueling operations involving a tanker aircraft and a receiver aircraft, and to a method for operating such a system.

BACKGROUND

Conventional primary systems for performing aerial refueling operations between a tanker aircraft and a receiver aircraft are the boom refueling system and the probe and drogue system.

The boom refueling system is based on the use of a boom device for interconnecting a tanker aircraft with a receiver aircraft or receptor in flight, the boom device being basically a telescopic or extensible tube attached to the underside of the tanker aircraft by means of an articulation element, therefore providing fuel passage from the tanker aircraft to the receiver aircraft. At the tanker aircraft, the operator controls visually all steps and procedures for a safe refueling operation, including maneuvering the boom device into a position appropriate for coupling with a receiver aircraft. From the tanker, the operator controls the boom movements and therefore manipulates the boom device until it makes a physical connection with the receptacle of the approaching receptor aircraft. Once the refueling operation is finished in a certain session, the boom is hoisted up to its secured position in the tanker aircraft.

In the probe and drogue system, a refueling hose having a drogue on one end is extended behind the tanker, to a position within a suitable range of the receiver aircraft. The receiver aircraft has a probe that must be coupled into the drogue, and after approaching, the refueling position is flown to mate the probe with the drogue.

Moreover, for both types of in-flight refueling systems, the operator at the tanker aircraft may be in some cases remotely positioned with respect to the boom device and drogue system, such that he controls the in-flight refueling operation via image capture operation.

Refueling operations, and in particular the approximation operation of the boom device relative to the receiver aircraft, is very sensitive and must be effected in a very precise and accurate way because of security reasons.

In the cases mentioned before, when refueling operations are being performed (using whichever of the systems that have been previously disclosed), and especially at night and sometimes under bad weather conditions, there exists the need of providing illuminating systems to properly illuminate the area of the receiver aircraft in which the refueling operation is to be performed.

Document U.S. Pat. No. 4,398,685 discloses a refueling system for a tanker aircraft comprising means for illuminating a receiver aircraft with infrared light (eye-safe light) providing a "refueling envelope", which is defined as that volume of space behind the tanker aircraft, within which limits the refueling boom may be maneuvered horizontally and vertically and extended or retracted without imposing undesirable stress on the refueling boom. Document U.S. Pat. No. 4,398,685 also discloses a refueling system further comprising means enabling the pilot of the receiver aircraft to view the tanker aircraft without interference from glare so as to accurately maneuver the receiver aircraft into a suitable position for effecting interconnection with the boom, with minimum communication between tanker and receiver aircraft.

Some drawbacks of this system are: the large electrical power supply, the large amount of excess heat and the large amounts of light in the visible wavelengths such that may hamper the vision of an operator in the receiver aircraft, which additionally may be visible for hostile observers.

Document EP 1751001 discloses an illuminating system that provides eye-safe and covert illumination adapted to uniformly illuminate an area of a first aircraft that may contain an in-flight refueling position, the system comprising a directing device configured to direct the emission, said emission being adapted to define an adjustable emission envelope containing a plurality of in-flight refueling positions. This system comprises a generating device configured to generate emission such that the emission is eye safe, being this a serious limitation in power, which may result in a inadequate illumination or a limited illuminated area.

There exists the need, however, of providing an illuminating system of a greater power therefore providing a higher illumination in order to overcome adverse situations such as lack of visibility or bad weather conditions. The known systems have a certain limit of power actuation because the light generating means need to provide eye-safe emissions.

The present invention is intended to solve said disadvantages.

SUMMARY OF THE INVENTION

In a first aspect, the present invention discloses a system for illuminating an in-flight refueling operation involving a tanker aircraft and a receiver aircraft, comprising:
- a generating device for generating a light emission;
- a directing device for directing the emission in order to define an emission envelope containing a spatial range of in-flight refueling positions of the receiver aircraft relative to the tanker aircraft;
- a collecting device for collecting the light emission generated by the generating device; and
- means for transmitting the light emission collected by the collecting device to the directing device.

According to the invention, the light emission generated by the generating device in the system for illuminating an in-flight refueling operation is an emission non eye-safe for persons, which makes it possible to use higher power in order to generate a higher illumination on the receiver aircraft. However, the system of the invention is configured to provide an eye-safe light emission for persons, at the working distance of the operator at the tanker aircraft.

A further advantage of the invention is that the collecting device allows the use of one or a set of the following: electroluminescent diode (led); laser; laser diode; hybrid of electroluminescent diode and a laser diode. The use of these kinds of light emission devices, in combination with other features of the invention, overcomes some of the problems of known systems, providing adequate illumination at low cost.

According to a second aspect, the invention discloses a method for operating such a system for illuminating an in-flight refueling operation involving a tanker aircraft and a receiver aircraft.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION OF THE INVENTION

Figure 1:
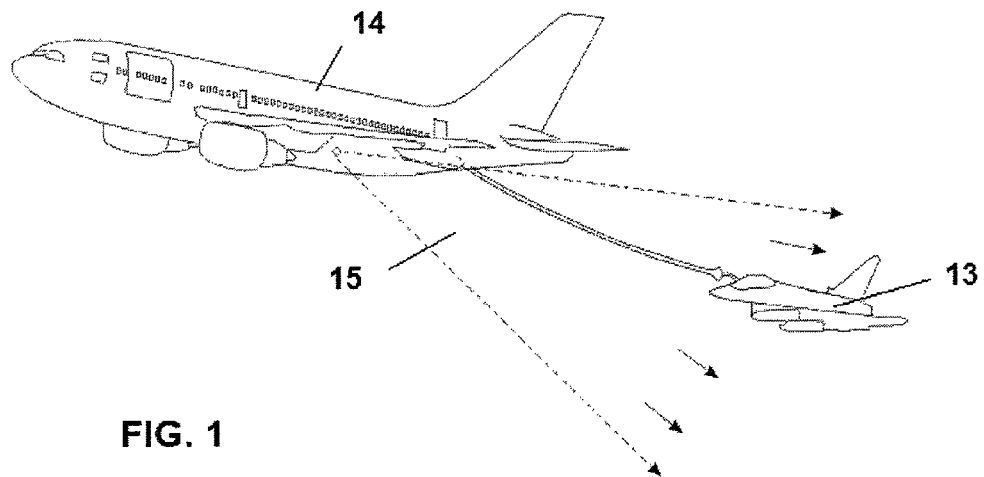
FIG. 1 shows a schematic view of a refueling operation between a tanker aircraft and a receiver aircraft, by means of an illuminating system according to the present invention.
Figure 2:
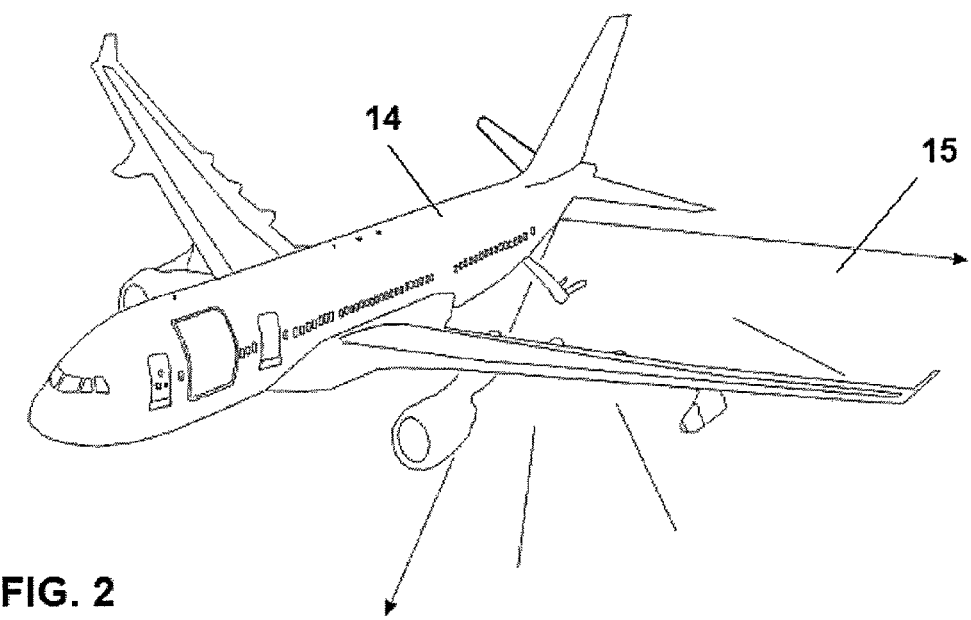
FIG. 2 shows a side detail view of the tanker aircraft effecting refueling operations by means of an illuminating system according to the present invention.
Figure 3:
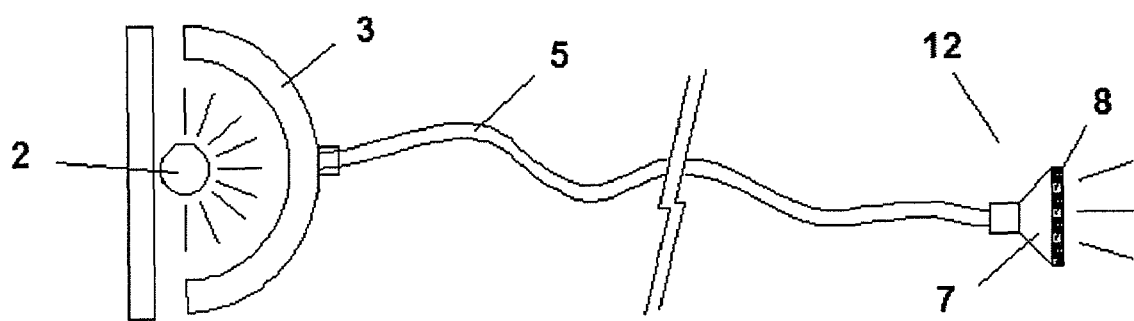
FIG. 3 shows a schematic view of the components of the illuminating system for in-flight refueling operations according to the invention.

When operations take place at the outside at dark conditions, appropriate illuminators are required to provide light (photons) to the working area. In order to transport them to the working area, usually a vehicle carries and protects them from any damage until needed. To avoid taking the unit out of the vehicle usually a hole is made to allow light to come out directly from the illuminator in the inside to the area where needed. A device is proposed to keep the hole at the vehicle fuselage as small as possible and to keep the illuminator module protected inside the vehicle. The device is based on the use of the following elements:

a generating device 2 for generating a light emission;

a directing device 12 for directing the emission to define an emission envelope 15 containing a spatial range of in-flight refueling positions of the receiver aircraft 13 relative to the tanker aircraft 14;

a collecting device 3 for collecting the light emission generated by the generating device, and means 5 for transmitting the light emission collected by the collecting device 3 to the directing device 12.

The light emission generated by the generating device 2 is generally non eye-safe for persons, allowing the use of any kind of light generating device or light source, able to provide the suitable amount of light power for a safe refueling within the whole range of operation.

The light emission generated by the generating device 2 is one or a set of the following: electroluminescent diode (led); laser; laser diode; hybrid of electroluminescent diode and a laser diode. In a preferred embodiment, the light emission generated by the generating device 2 is a laser diode with a wavelength comprised in the range of about 770 and 809 nanometers.

The collecting device 3 is preferably a reflecting surface or a collimator for concentrating light. The reflecting surface is preferred when the generating device is one or a number of electroluminescent diodes, being preferably of a paraboloidal geometry. The use of a collimator as collecting device 3 is usually convenient when the generating device is one or a number of laser or laser diodes.

Most preferably, the means 5 for transmitting the light emission collected by the collecting device 3 to the directing device 12 are fiber optic means 5 (FIG. 1). The means 5 for transmitting the light emission may also consist of any fiber suitable or adapted for transmitting light, or any other kind of light guide, such as light ducts or tubes with an inner surface suitable for reflecting the light and with a radius of curvature that permits an effective light transmission.

Also, the means 5 for transmitting the light emission collected by the collecting device 3 may further comprise other energy transmission devices suitable for the transmission of the emission collected by the collecting device 3 to the directing device 12.

The directing device 12 for directing the emission to define an emission envelope according to the invention preferably comprises a focus 7, acting as reflecting and supporting device, and preferably comprises an expander 8 for changing the trajectory of the photons of the light emission, sending said light emission to the area of interest, this expander 8 being preferably a holo-graphic diffuser.

The system is configured to provide an eye-safe light emission for persons, at the working distance of the operator. This is mostly achieved by reducing the concentration of energy, essentially light energy, usually after the transmission of the light emission by the means 5 for transmitting to the outside of the tanker aircraft 14. Most of the reduction of the concentration of energy takes effect in the directing device 12 and its elements, and also as the light is propagated through the air while defining the operating envelope. Additionally, the attenuation of energy in the different elements of the system also contributes to make it eye-safe for persons, at the working distance of the operator. Although this attenuation should usually be minimized in all elements, the system is adapted to provide an eye-safe light emission at the working distance of the operator as a result of the combination of both effects, attenuation and reduction of concentration, taking place to a given degree in the elements of the system.

According to a second aspect, the invention relates to a method for illuminating an in-flight refueling operation involving a tanker aircraft 14 and a receiver aircraft 13, such that the method comprises the following steps:

a) generating a light emission, substantially in a near infrared spectrum;

b) collecting said light emission by means of a collecting device 3;

c) transmitting said collected light emission; and d) directing the transmitted emission to define an emission envelope 15, said envelope 15 containing a spatial range of in-flight refueling positions of the receiver aircraft 13 relative to the tanker aircraft 14.

The light emission generated in step a) of the method that has just been disclosed, in non eye-safe for persons. However, the light emission directed in step d) is eye-safe in the working distance of the operator.

The light emission in step a) of the above-mentioned method can be generated by an electroluminescent diode, a laser, or a hybrid of an electroluminescent diode and a laser diode.

In a preferred embodiment, the light emission generated in step a) of the above-mentioned method has a wavelength comprised in the range of about 770 and 809 nanometers Although the present invention has been fully described in connection with preferred embodiments, it is evident that modifications may be introduced within the scope thereof, not considering this as limited by these embodiments, but by the contents of the following claims.

The invention claimed is:

1. System for illuminating an in-flight refueling operation involving a tanker aircraft and a receiver aircraft, comprising:

a generating device for generating a light emission, substantially in a near infrared spectrum that is non eye-safe for persons;

a directing device for directing the emission to define an emission envelope containing a spatial range of in-flight refueling positions of the receiver aircraft relative to the tanker aircraft;

a collecting device for collecting the light emission generated by the generating device, and means for transmitting the light emission collected by the collecting device to the directing device.

2. System according to claim 1, wherein the system is configured to provide light emission to the outside of the tanker aircraft which is eye-safe for persons at the working distance of the operator.

3. System according to claim 1, wherein the light emission generated by the generating device is one or a set of the following: electroluminescent diode (led); laser; laser diode; hybrid of electroluminescent diode and a laser diode.

4. System according to claim 3, wherein the light emission generated by the generating device is a laser diode with a wavelength comprised in the range of about 770 and 809 nanometers.

5. System according to claim 1, wherein the collecting device is a reflecting surface of a paraboloidal geometry.

6. System according to claim 1, wherein the collecting device is a collimator for concentrating light.

7. System according to claim 1, wherein the means for transmitting the light emission collected by the collecting device to the directing device are fiber optic means.

8. System according to claim 1, wherein the means for transmitting the light emission collected by the collecting device may further comprise other energy transmission devices suitable for the transmission of the emission collected by the collecting device to the directing device.

9. System according to claim 1, wherein the directing device for directing the emission to define an emission envelope comprises a focus, acting as reflecting and supporting device, and an expander for changing the trajectory of the photons of the light emission, sending said light emission to the area of interest.

10. System according to claim 9, wherein the expander is a holographic diffuser.

11. Method for illuminating an in-flight refueling operation involving a tanker aircraft and a receiver aircraft, comprising the following steps:
   a) generating a light emission, substantially in a near infrared spectrum that is non eye-safe to persons
   b) collecting said light emission by means of a collecting device;
   c) transmitting said collected light emission; and
   d) directing the transmitted emission to define an emission envelope, said envelope containing a spatial range of in-flight refueling positions of the receiver aircraft relative to the tanker aircraft.

12. Method according to claim 11, wherein the light emission directed in step d) is eye-safe at the working distance of the operator.

13. Method according to claim 11, wherein the light emission in step a) is generated by one or a set of the following means: an electroluminescent diode (led); a laser; a laser diode; a hybrid of an electroluminescent diode and a laser diode.

* * * * *